US008452431B2

(12) United States Patent
Johnston et al.

(10) Patent No.: US 8,452,431 B2
(45) **Date of Patent: *May 28, 2013**

(54) EFFECTIVE DEPLOYMENT OF TEMPORAL NOISE SHAPING (TNS) FILTERS

(75) Inventors: James David Johnston, Morristown, NJ (US); Shyh-Shiaw Kuo, Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 653 days.

This patent is subject to a terminal disclaimer.

(21) Appl. No.: 12/644,302

(22) Filed: Dec. 22, 2009

(65) Prior Publication Data

US 2010/0100211 A1 Apr. 22, 2010

Related U.S. Application Data

(63) Continuation of application No. 11/457,230, filed on Jul. 13, 2006, now Pat. No. 7,664,559, which is a continuation of application No. 12/216,812, filed on Aug. 31, 2005, now Pat. No. 7,548,790, which is a continuation of application No. 09/537,948, filed on Mar. 29, 2000, now Pat. No. 7,099,830.

(51) Int. Cl.

| | |
|---|---|
| ***G06F 17/00*** | (2006.01) |
| ***G06F 17/10*** | (2006.01) |
| ***G10L 19/00*** | (2006.01) |
| ***H04B 15/00*** | (2006.01) |

(52) U.S. Cl.

USPC ............. 700/94; 704/500; 381/94.1; 708/322

(58) Field of Classification Search

USPC ..... 700/94; 708/322; 704/205, 500; 381/94.3

See application file for complete search history.

(56) References Cited

U.S. PATENT DOCUMENTS

| | | | |
|---|---|---|---|
| 4,307,380 | A | 12/1981 | Gander |
| 4,860,355 | A | 8/1989 | Copperi |
| 4,896,356 | A | 1/1990 | Millar |
| 5,105,463 | A | 4/1992 | Veldhuis et al. |
| 5,264,846 | A | 11/1993 | Oikawa |
| 5,448,680 | A | 9/1995 | Kang et al. |

(Continued)

OTHER PUBLICATIONS

Herre et al., "Continuously signal-adaptive filterbank for high-quality perceptual audio coding," 1997 IEEE Workshop on Applications of signal Processing to Audio and Acoustics, 1997, 4 pages.

(Continued)

*Primary Examiner* — Andrew C Flanders
*Assistant Examiner* — Daniel Sellers

(57) ABSTRACT

The MPEG2 Advanced Audio Coder (AAC) standard limits the number of filters used to either one filter for a "short" block or three filters for a "long" block. In cases where the need for additional filters is present but the limit of permissible filters has been reached, the remaining frequency spectra are simply not covered by TNS. Two solutions are proposed to deploy TNS filters in order to get the entire spectrum of the signal into TNS. The first method involves a filter bridging technique and complies with the current AAC standard. The second method involves a filter clustering technique. Although the second method is both more efficient and accurate in capturing the temporal structure of the time signal, it is not AAC standard compliant. Thus, a new syntax for packing filter information derived using the second method for transmission to a receiver is also outlined.

18 Claims, 8 Drawing Sheets

U.S. PATENT DOCUMENTS

| | | | | |
|---|---|---|---|---|
| 5,522,009 | A | 5/1996 | Laurent | |
| 5,530,750 | A | 6/1996 | Akagiri | |
| 5,583,784 | A | 12/1996 | Kapust et al. | |
| 5,606,618 | A | 2/1997 | Lokhoff et al. | |
| 5,699,484 | A | 12/1997 | Davis | |
| 5,732,189 | A | 3/1998 | Johnston et al. | |
| 5,749,065 | A | 5/1998 | Nishiguchi et al. | |
| 5,781,888 | A | 7/1998 | Herre | |
| 5,864,802 | A | 1/1999 | Kim et al. | |
| 5,943,367 | A | 8/1999 | Theunis | |
| 6,029,126 | A | 2/2000 | Malvar | |
| 6,049,797 | A | 4/2000 | Guha et al. | |
| 6,240,380 | B1 | 5/2001 | Malvar | |
| 6,275,835 | B1 * | 8/2001 | Pisek et al. | 708/300 |
| 6,295,009 | B1 | 9/2001 | Goto | |
| 6,456,963 | B1 | 9/2002 | Araki | |
| 6,502,069 | B1 | 12/2002 | Grill et al. | |
| 6,522,753 | B1 | 2/2003 | Matsuzawa et al. | |
| 6,771,777 | B1 | 8/2004 | Gbur et al. | |
| 7,395,211 | B2 | 7/2008 | Watson et al. | |
| 7,499,851 | B1 | 3/2009 | Johnston et al. | |
| 7,657,426 | B1 | 2/2010 | Johnston et al. | |
| 7,664,559 | B1 | 2/2010 | Johnston et al. | |
| 2010/0100211 | A1 | 4/2010 | Johnston et al. | |

OTHER PUBLICATIONS

Sinha et al., "Audio compression at low bit rates using a signal adaptive switched filterbank", 1996 IEEE International Conference on Acoustics, Speech and Signal Processing, May 1996, pp. 1053-1056.

Jurgen Herre et al., "Enhancing the Performance of Perceptual audio Coders by Using Temporal Noise Shaping (TNS)," pp. 1-24, presented at the 101st Convention of the audio Engineering Society, Los angeles, California, Nov. 8-11, 1996.

Allen Gersho et al., "Vector Quantization and Signal Compression," Kluwer Academic Publishers, pp. 360-361, 1992.

Lawrence Rabiner et al., "Fundamentals of Speech Recognition", 1993, Prentice Hall PTR, pp. 100-132 and 190-193.

* cited by examiner

*FIG. 7*

```
<NumberOfFilters> <LowSFBof1stFilter> <1stFilterOrder> <1stFilterCoeff>
                  <LowSFBof2ndFilter> <2ndFilterOrder> <2ndFilterCoeff>
                  <LowSFBof3rdFilter> <3rdFilterOrder> <3rdFilterCoeff>
```

*FIG. 8*

```
<8> <LowSFB_b1> <Order_FilterB> <Coeff_FilterB>
    <LowSFB_b2> <Order_FilterA> <Coeff_FilterA>
    <LowSFB_b3> <-1>
    <LowSFB_b4> <-2>
    <LowSFB_b5> <-1>
    <LowSFB_b6> <-2>
    <LowSFB_b7> <-1>
    <LowSFB_b8> <-2>
```

*FIG. 9*

```
<8> <LowSFB_b1> <Order_FilterB> <Coeff_FilterB>
    <LowSFB_b2> <Order_FilterA> <Coeff_FilterA>
    <LowSFB_b3> <-1>
    <LowSFB_b4> <Order_FilterC> <Coeff_FilterC>
    <LowSFB_b5> <-1>
    <LowSFB_b6> <-2>
    <LowSFB_b7> <-1>
    <LowSFB_b8> <-2>
```

*FIG. 10*

<is.TNS> <Filter A> <Filter B> <mask>

*FIG. 11*

<is.TNS> = 1
<Filter A> = <1> <SFB$_1$> <12> <Coeff>
<Filter B> = <1> <SFB$_4$> <10> <Coeff>
<Mask> = <47 bits>

*FIG. 12*

<is.TNS> = 1
<Filter A> = <3> <SFB$_{44}$> <12> <Coeff>
<SFB$_{30}$> <12> <Coeff>
<SFB$_1$> <-1>
<Filter B> = <1> <SFB$_1$> <10> <Coeff>
<Mask> = <47 bits>

EFFECTIVE DEPLOYMENT OF TEMPORAL NOISE SHAPING (TNS) FILTERS

The present application is a continuation of U.S. patent application Ser. No. 11/457,230, filed Jul. 13, 2006, which is a continuation of U.S. patent application Ser. No. 11/216,812, filed Aug. 31, 2005, now U.S. Pat. No. 7,548,790, which is a continuation of U.S. patent application Ser. No. 09/537,948, filed on Mar. 29, 2000, now U.S. Pat. No. 7,099,830, the contents of which are incorporated herein by reference in their entirety.

FIELD OF THE INVENTION

This invention relates generally to TNS filter signal processing and, more particularly, to the effective deployment of TNS filters.

BACKGROUND

Temporal Noise Shaping (TNS) has been successfully applied to audio coding by using the duality of linear prediction of time signals. (See, J. Herre and J. D. Johnston, "Enhancing the Performance of Perceptual Audio Coding by Using Temporal Noise Shaping (TNS)," in 101*st AES Convention, Los Angeles*, November 1996, a copy of which is incorporated herein by reference). As is well known in the art, TNS uses open-loop linear prediction in the frequency domain instead of the time domain. This predictive encoding/decoding process over frequency effectively adapts the temporal structure of the quantization noise to that of the time signal, thereby efficiently using the signal to mask the effects of noise.

In the MPEG2 Advanced Audio Coder (AAC) standard, TNS is currently implemented by defining one filter for a given frequency band, and then switching to another filter for the adjacent frequency band when the signal structure in the adjacent band is different than the one in the previous band. This process continues until the need for filters is resolved or, until the number of permissible filters is reached. With respect to the latter, the AAC standard limits the number of filters used for a block to either one filter for a "short" block or three filters for a "long" block. In cases where the need for additional filters remains but the limit of permissible filters has been reached, the frequency spectra not covered by a TNS filter do not receive the beneficial masking effects of TNS.

This current practice is not an effective way of deploying TNS filters for most audio signals. For example, it is often true for an audio signal that a main (or stronger) signal is superimposed on a background (or weaker) signal which has a different temporal structure. In other words, the audio signal includes two sources, each with different temporal structures (and hence TNS filters) and power spectra, such that one signal is audible in one set of frequency bands, and the other signal is audible in another set of frequency bands. FIG. 1C illustrates such a signal within a single long block. The signal in FIG. 1C is composed of the two signals shown in FIGS. 1A and 1B, each of which have different temporal structures (envelopes). The corresponding spectra of these signals are shown in FIGS. 1D-1F, respectively. From FIG. 1F, it can be seen that the signal shown in FIG. 1A is audible in the set of frequency bands b2, b4, b6 and b8. In contrast, the signal shown in FIG. 1B is audible in the bands b1, b3, b5 and b7. In order for the entire spectra of the signal to be covered by TNS filters, the current implementation requires eight filters, the encoding of which would consume too many bits using the AAC syntax, and thus, is not permitted by the AAC standard.

To comply with the AAC standard, only three filters, e.g., those corresponding to bands b1, b2 and b3 are coded for transmission to the receiver. This results in part of the spectrum (e.g., b4 through b8) not being covered by TNS filters, with the adverse effect that audible artifacts may appear in the reconstructed signal.

SUMMARY OF THE INVENTION

The above-identified problems are solved and a technical advance is achieved in the art by providing a method for effectively deploying INS filters for use in processing audio signals. An exemplary method includes calculating a temporal noise filter for each of a plurality of frequency bands; determining a distance between coefficients of temporal noise shaping filters in adjacent frequency bands; merging ones of the temporal noise shaping filters with a shortest distance between coefficients; clustering the temporal noise shaping filters into at least two groups; and using a centroid of each of the at least two groups as a final temporal noise shaping filter for a plurality of frequency ranges covered by each respective one of the at least two groups.

Another method includes determining a first temporal noise shaping filter for a first frequency range; determining a second temporal noise shaping filter for a second frequency range that includes the first frequency range; calculating a first Euclidean distance using coefficients of the first temporal noise shaping filter; calculating a second Euclidean distance between the coefficients of the first temporal noise shaping filter and coefficients of the second temporal noise shaping filter; calculating a first prediction gain using the first temporal noise shaping filter; calculating a second prediction gain of the second temporal noise shaping filter; and deploying the first temporal noise shaping filter for the first frequency range when the second Euclidean distance is greater than the first Euclidean distance and the second prediction gain is less than the first prediction gain. When the second Euclidean distance is not greater than the first Euclidean distance or the second prediction gain is not less than the first prediction gain, performing: setting the first temporal noise shaping filter to equal the second temporal noise shaping filter, setting the first Euclidean distance to equal the second Euclidean distance, setting the first prediction gain to equal the second prediction gain, re-determining the second temporal noise shaping filter for a new frequency range, recalculating the second Euclidean distance between coefficients of the first temporal noise shaping filter and the second temporal noise shaping filter, and recalculating the second prediction gain between the first temporal noise shaping filter and the second temporal noise shaping filter. The method further includes merging ones of the temporal noise shaping filters with a shortest Euclidean distance between coefficients; clustering the temporal noise shaping filters into at least two groups; and using a centroid of each of the at least two groups as a final temporal noise shaping filter for a plurality of frequency ranges covered by each respective one of the at least two groups.

Other and further aspects of the present invention will become apparent during the course of the following description and by reference to the attached drawings.

BRIEF DESCRIPTION OF THE DRAWINGS

FIG. 7 is a diagram illustrating the conventional AAC standard syntax for encoding TNS filter information.

FIG. 8 is a diagram illustrating a syntax for encoding TNS filter information in accordance with one aspect of the present invention.

FIG. 9 is a diagram illustrating an example of the syntax of FIG. 8.

FIG. 10 is a diagram illustrating an alternate syntax for encoding TNS filter information in accordance with another aspect of the present invention.

FIGS. 11 and 12 are diagrams illustrating examples of the syntax of FIG. 10.

DETAILED DESCRIPTION

Figure 1A:
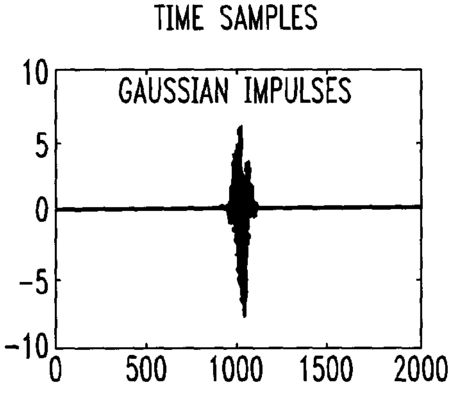
FIGS. 1A and 1B represent an audio signal and noise, respectively.
Figure 1D:
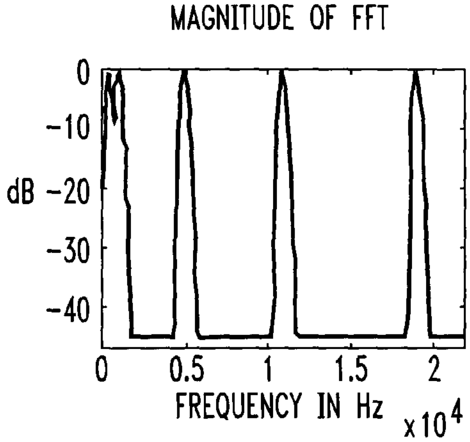
FIGS. 1D-1F represent the frequency spectra of the signals illustrated in FIGS. 1A-1C, respectively.
Figure 1B:
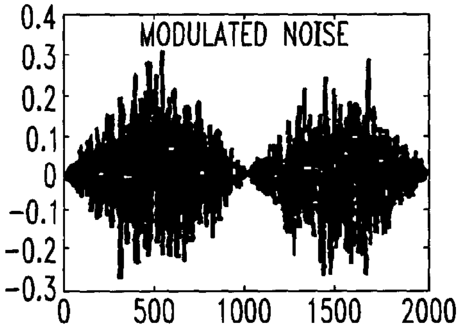
Figure 1E:
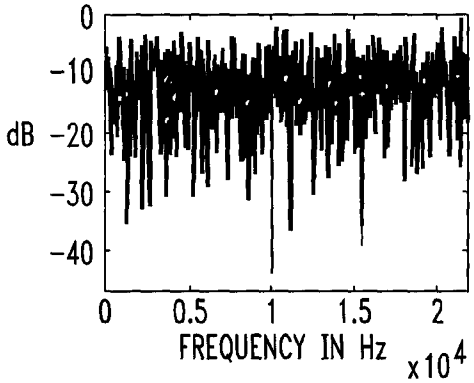
Figure 1C:
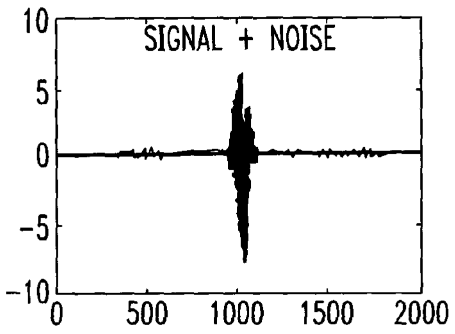
FIG. 1C represents a superposition of the signals in FIGS. 1A and 1B.
Figure 1F:
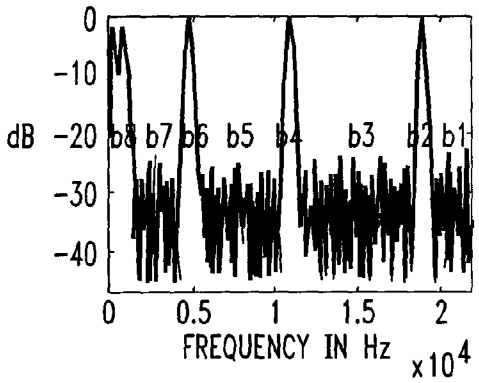

Referring now to the drawings, as previously discussed, FIGS. 1A-1C illustrate an audio signal, a noise signal, and a superposition of these two signals within a block, respectively. The frequency spectra of each signal is illustrated in FIGS. 1D-1F. From FIG. 1F, it can be seen that the signal shown in FIG. 1A is audible in the set of frequency bands including b2, b4, b6 and b8. In contrast, the signal shown in FIG. 1B is audible in bands covering b1, b3, b5 and b7. In order for the entire spectra of the block to be covered by TNS filters, the current method of TNS filter deployment would require eight filters—one for each of the frequency bands 1 through 8, which, as discussed above, is not permitted by the current AAC standard.

Figure 2:
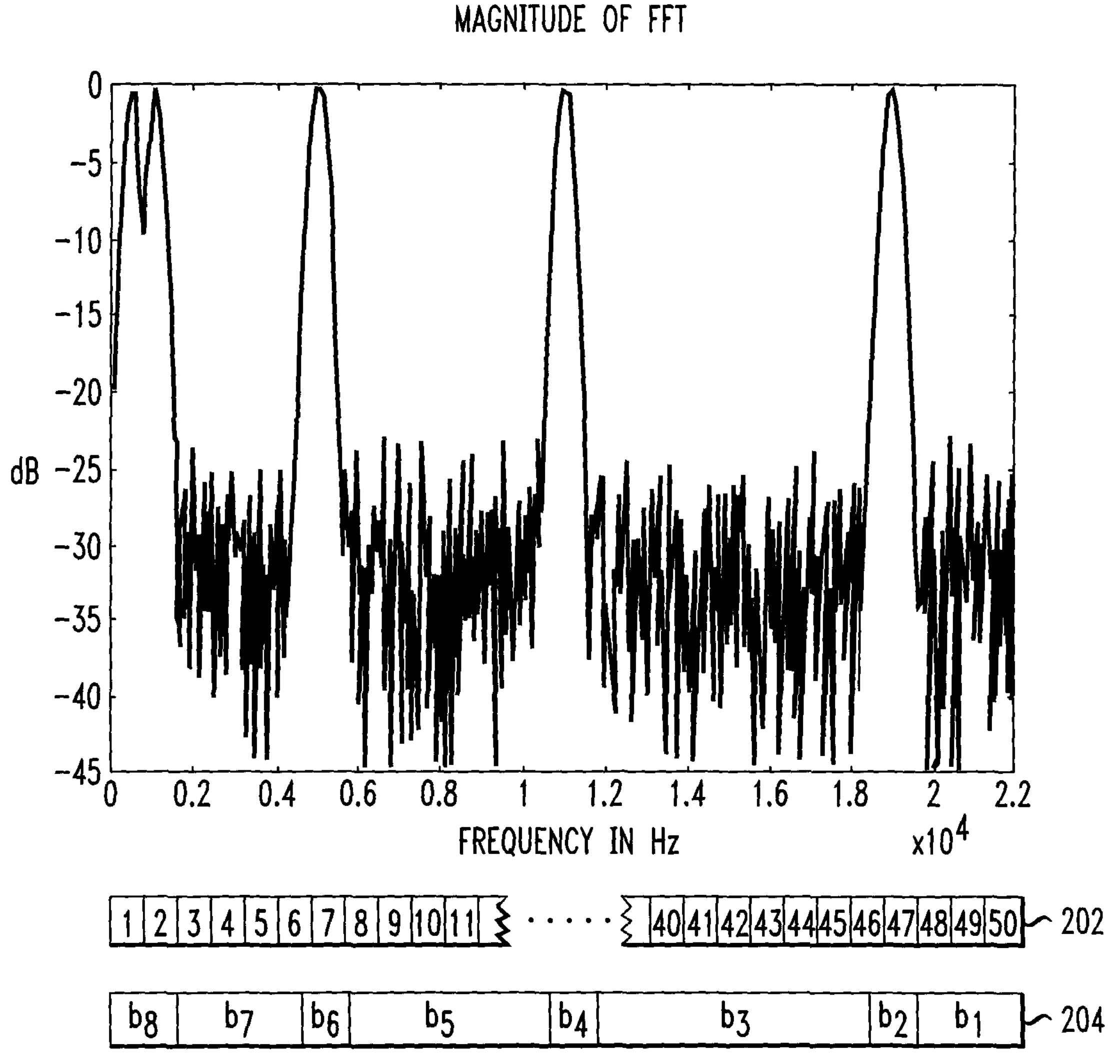
FIG. 2 is an enlargement of FIG. 1F.

FIG. 2 is essentially FIG. 1F enlarged to illustrate how the boundaries of frequency bands such as b1 through b8 are defined in accordance with one aspect of the present invention. As indicated by reference numeral 202, the frequency range of the entire signal block (e.g., 2.2 kHz) is divided into approximately fifty bands. These fifty bands may be scale factor bands (SFB) and will be referred to as such hereinafter. For purposes of illustration, the SFBs are shown as being of equal length. In actuality, however, the SFBs will be of unequal length based on the characteristics of human hearing (e.g., $SFB_1$ may be only 3 bins wide, while $SFB_{50}$ may be 100 bins wide). It will be understood that any prearranged frequency division may be used. The frequency bands b1-b8 shown in FIG. 1F are indicated by reference numeral 204. Each band b1-b8 requires the use of a unique TNS filter for the spectrum coefficients of the signal within the band. It will be understood that the number of bands within a block is a function of the signal to be encoded, and thus, is not limited to eight bands. The boundary of a band is defined by reference to the signal to be encoded and, in particular, to the presence in the signal of a unique time structure between SFBs. For example, as shown in FIG. 2, a different time structure can be identified in the signal between SFB 46 and SFB 45. This establishes the lower boundary of a first band b1 as SFB 46. Similarly, a different time structure can be identified in the signal between SFB 44 and SFB 43. This establishes SFB 44 as the lower boundary of a second band b2. An exemplary method for determining the boundary between bands and thus, the number of bands and TNS filters required for a block, will be discussed in detail hereinafter in connection with FIG. 3.

Figure 3:
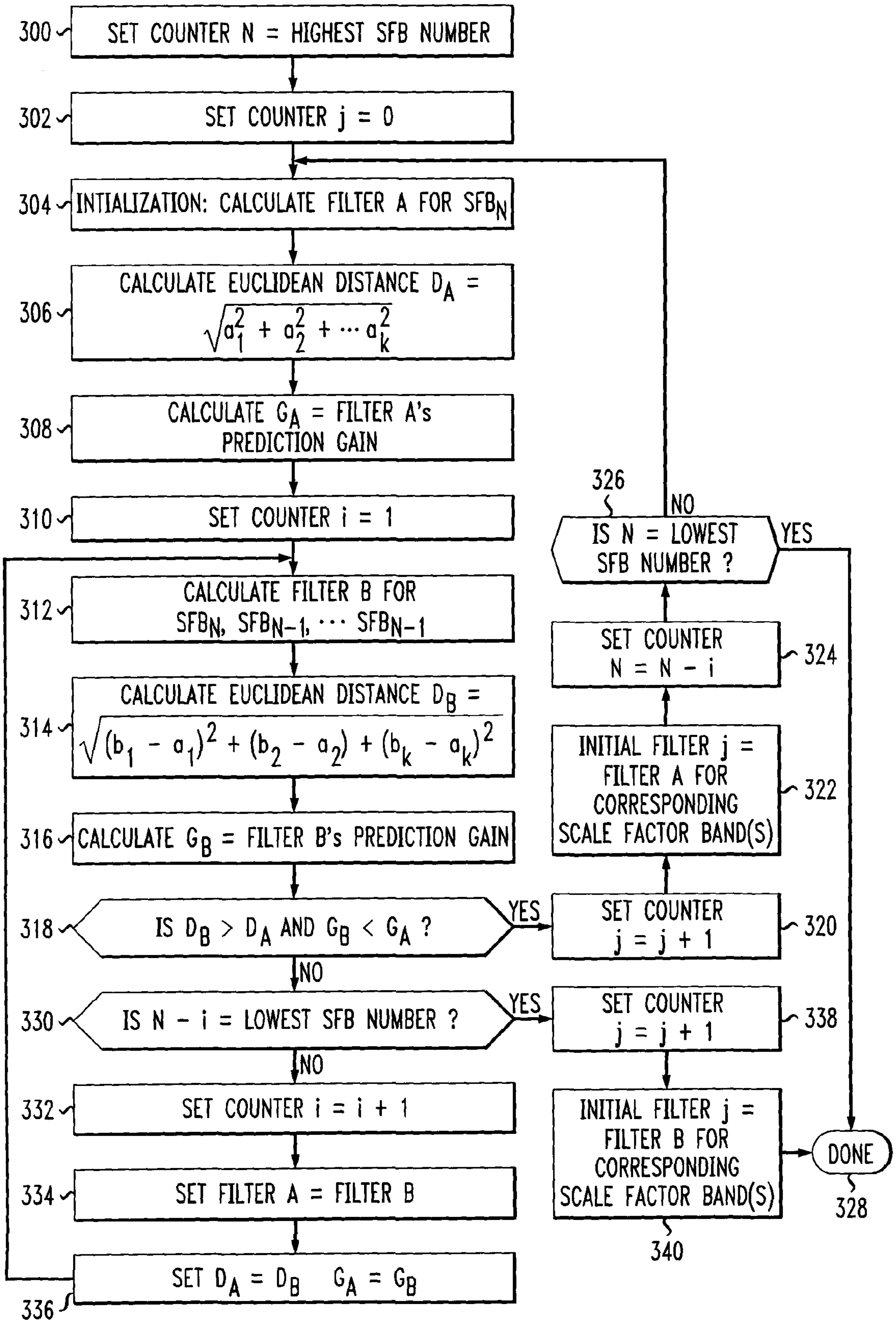
FIG. 3 is a flowchart illustrating exemplary method for determining the boundary between frequency bands, and thus, the number of bands and TNS filters required for a block in accordance with one aspect of the present invention.

As illustrated in FIG. 3, in step 300, a counter N is set to the highest SFB number. We will assume 50 SFBs are used as illustrated in FIG. 2. In this case, counter N is set to 50. In step 302, counter j is set to 0. In step 304, a TNS filter is calculated for the spectrum coefficients within $SFB_{50}$. In step 306, a Euclidean distance $D_A$ between Filter A's PARCOR coefficients 1 to k and a null set of k coefficients is calculated. In step 308, Filter A's prediction gain, $G_A$, is calculated. In step 310, a counter i is set to 1. In step 312, TNS Filter B is calculated for the spectrum coefficients within $SFB_N$, $SFB_{N-1}$, $SFB_{N-i}$, or, in other words, $SFB_{50}$ and $SFB_{49}$. In step 314, the Euclidean distance $D_B$ between Filter B's PARCOR coefficients and those of Filter A is calculated. In step 316, Filter B's prediction gain, $G_B$, is calculated. In step 318, a determination is made as to whether the Euclidean distance has increased and the prediction gain has decreased (i.e., whether $D_B>D_A$ and $G_B<G_A$.).

If there has not been both an increase in Euclidean distance and a decrease in prediction gain, this means that a new signal structure has not yet appeared in the newly included $SFB_{49}$, and thus, that the lower boundary of band "b1" has not yet been determined. In that case, in step 330, a determination is made as to whether N−i, or, in other words, whether 50−1=49 is the lowest SFB number. If, as in our example, it is not, in step 332 counter i is set to i+1, and in steps 334 and 336, new Filter A is set to old Filter B and the new Euclidean distance $D_A$ and new prediction gain $G_A$ are set to the old $D_B$ and $G_B$, respectively (i.e., using the spectrum coefficients within $SFB_{50}$, $SFB_{49}$). At that point, control is returned to step 312, and Filter B is calculated for the spectrum coefficients within $SFB_{50}$, $SFB_{49}$ and $SFB_{48}$. In step 314, the Euclidean distance $D_B$ between Filter B's PARCOR coefficients and the coefficients of new Filter A is calculated. In step 316, Filter B's prediction gain $G_B$ is calculated. In step 318, a determination is again made as to whether both the Euclidean distance has increased and the prediction gain has decreased.

If both conditions have not been satisfied, then steps 330 through 336 and steps 312 through 318 are repeated until either, in step 318, both conditions are satisfied or, in step 330, the lowest SFB is reached. For the exemplary signal of FIG. 2, the process would be repeated until Filter B is calculated for the range consisting of $SFB_{45}$ through $SFB_{50}$, since, as is apparent from FIG. 2, a new signal structure appears in the newly included $SFB_{45}$. At that point, the conditions in step 318 are satisfied. In step 320, counter j is set to j+1 and, in step 322, Filter A (calculated for $SFB_{46-50}$) is used as Initial Filter (i.e., Initial Filter') for the frequency range spanning $SFB_{46}$ through $SFB_{50}$. The TNS filters defined by the method illustrated in FIG. 3 are referred to herein as "initial" TNS filters. If the number of initial filters is less than or equal to the number permitted, e.g., by the AAC standard, then these will be the "final" filters used for transmission. Otherwise, additional processing is performed in accordance with one aspect of the present invention to permit the entire spectrum of the signal to be covered by TNS. The additional processing will be described in detail below in connection with FIGS. 4A, 4B and 5.

Continuing with FIG. 3, in step 324, counter N is set to N−i. Because i=5 at this point in the processing, N=45. In step 326, a determination is made as to whether N is the lowest SFB number. If N equals the lowest SFB number, then in step 328, the process is terminated since all the initial TNS filters have been calculated.

In our example, since N=45 is not the lowest SFB, control is returned to step 304, where Filter A is calculated for $SFB_{45}$. As was performed for $SFB_{50}$, the Euclidean distance $D_A$ between Filter A's PARCOR coefficients 1 to k and a null set is calculated. Filter A's prediction gain is also calculated. In step 312, Filter B is calculated for the spectrum coefficients within $SFB_{45}$ and $SFB_{44}$. In step 314, the Euclidean distance $D_B$ between Filter B's PARCOR coefficients and those of Filter A is calculated. In step 316, Filter B's prediction gain is calculated. In step 318, a determination is again made as to whether the Euclidean distance has increased and the prediction gain has decreased.

If both the distance has not increased and the prediction gain has not decreased, then steps 330 through 336 and 312 through 318 are repeated until either the conditions in step 318 are satisfied or in step 330 the lowest SFB is reached. For the signal of FIG. 2, the process would be repeated until Filter B is calculated for the range consisting of $SFB_{43}$ through $SFB_{45}$, since, a new signal structure develops in the newly included $SFB_{43}$. At that point, the conditions in step 318 will be satisfied. In step 320, counter j is set to j+1 and, in step 322, Filter A (calculated for $SFB_{44\text{-}45}$) is used as Initial $\text{Filter}_S$ (i.e., Initial $\text{Filter}_2$) for the frequency range spanning $SFB_{44}$ and $SFB_{45}$. In step 324, counter N is set to N−i. Because i=7 at this point in the processing, N=43. As will be appreciated from the foregoing, the process of identifying boundaries is repeated in the above-described manner until all the bands and initial TNS filters are defined for the block (in our example, eight Initial Filters corresponding to bands b1-b8).

With respect to the last initial filter in the signal of FIG. 2 (i.e., band b8), in step 318, after having determined that the distance and predication gain conditions for Filter A covering $SFB_{2\text{-}3}$ and Filter B covering $SFB_{1\text{-}3}$ have not been satisfied, in step 330, a determination is made that the lowest SFB has been reached. In other words, that N−i=1. At that point N=3 and i=2, and thus, N−i=1. In that case, in step 338, counter j is set to j+1. At that point j=7, and thus, counter j is set to 8. In step 340, Filter B (calculated for $SH_{1\text{-}3}$) is used as Initial $\text{Filter}_j$ (i.e., Initial $\text{Filter}_8$) for the frequency range spanning $SFB_1$ through $SFB_3$. In step 328, processing is terminated because all the initial filters necessary to cover the entire spectrum have been calculated.

As indicated above, if the number of initial filters needed to cover the entire spectrum is less than or equal to the number permitted by, e.g., the AAC standard, then the initial filters are the final filters. Otherwise, additional processing in accordance with other aspects of the present invention is performed to ensure that the entire spectrum is covered by TNS. One method of ensuring complete TNS filter coverage is referred to herein as TNS "filter bridging" and is described in detail in connection with FIG. 4A. Briefly, the method involves calculating the PARCOR Euclidean distance between every two adjacent initial filters (i.e., those defined, for example, in accordance with the method of FIG. 3), and merging the two with the shortest distance. "Merging" involves calculating a new initial filter for the frequency bands covered by the two adjacent initial filters. The new initial filter replaces the two adjacent initial filters, and thus, the merging step reduces the total number of initial filters by a single filter. This process is repeated until the total number of permissible filters is reached.

Figure 4A:
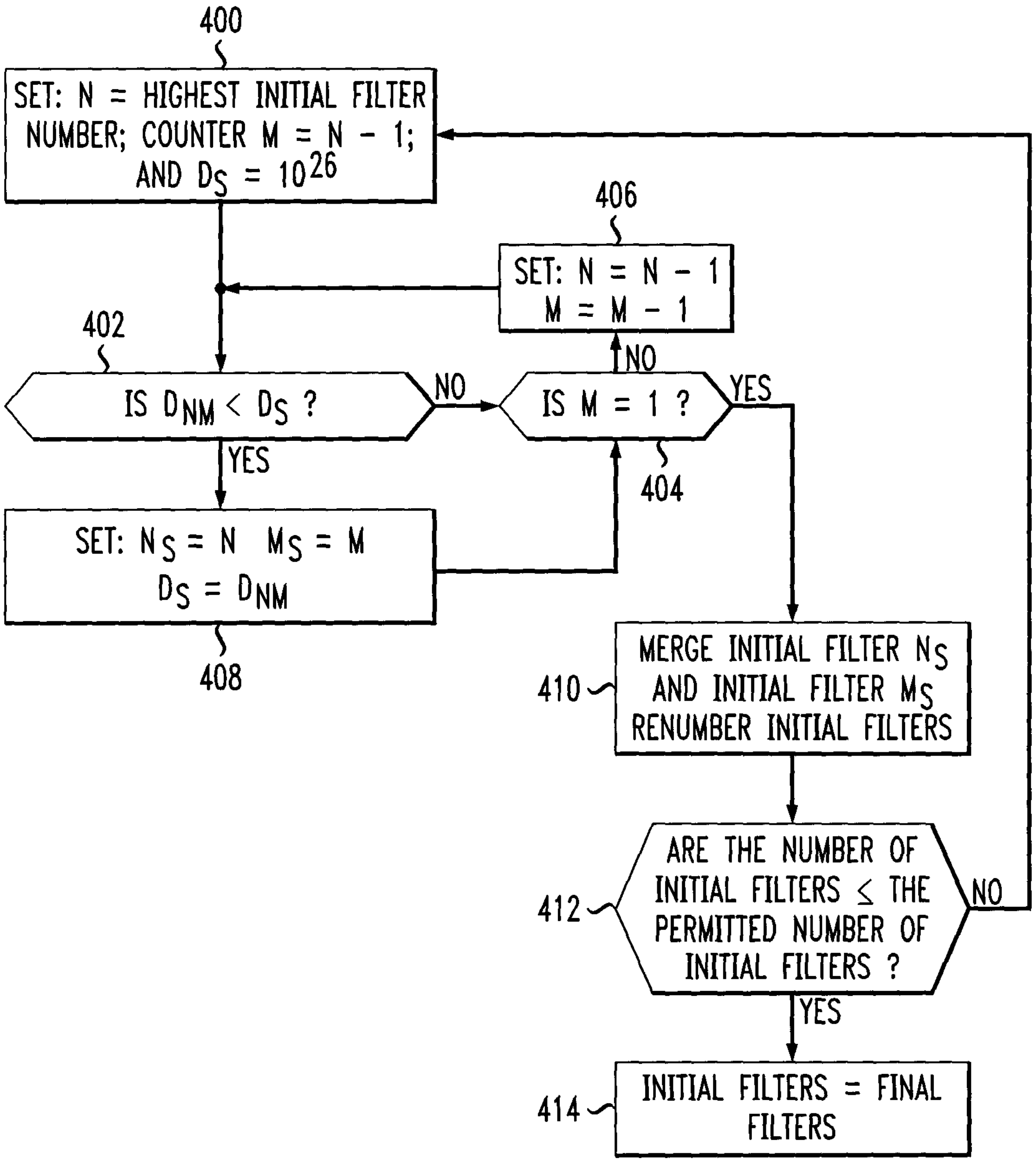
FIG. 4A is a flowchart illustrating an exemplary method of bridging TNS filters in accordance with one aspect of the present invention.

Turning to FIG. 4A, in step 400, N is set to the highest initial filter number, counter M is set to N−1, and $D_S$ is set to a large number such as $10^{26}$. $D_S$ denotes the Euclidean distance between the PARCOR coefficients of reference filters $N_S$ and $M_S$. In step 402, a determination is made as to whether the Euclidean distance between the coefficients of Filters N and M (denoted $D_{N,M}$) is less than $D_S$. For the signal of FIG. 2, this would involve determining the distance between the coefficients of filters 8 and 7 for comparison with $D_S$. If the distance is not less than $D_S$, then in step 404, a determination is made as to whether we have considered the last initial filter pair (i.e., whether M=1). If the last initial filter pair has not yet been considered, then, in step 406, N is set to N−1 and M is set to M−1. In other words, the next adjacent filter pair is selected for comparison with $D_S$. For the signal of FIG. 2, the next adjacent pair would be filters 7 and 6. Steps 402 through 406 are repeated until a filter pair is selected that meets the condition in step 402. At that point, in step 408, N and M are substituted as reference filters $N_S$ and $M_S$. In addition, $D_{N,M}$ is substituted for $D_S$ as the closest Euclidean distance between filter pairs thus far identified. Steps 402 through 408 are repeated until, in step 404, the last filter pair has been considered. At that point, in step 410, initial filter $N_S$ is merged with initial filter $M_S$ and, the initial filters are renumbered. In step 412, a determination is made as to whether the number of initial filters is less than or equal to the permitted number of initial filters. If the permitted number of initial filters has been reached, then, in step 414, the initial filters become the final filters used for the block. If the allowed number of filters has not yet been reached, control is returned to step 400 and the process of merging pairs of filters with the closest Euclidean distance between their PARCOR coefficients proceeds until the permitted number of filters is reached. As an example, for the signal of FIG. 2, bands b1, b2, and b3 may correspond to the first final TNS filter, bands b4 and b5 to the second final filter, and bands b6, b7 and b8 to the third final filter.

Figure 4B:
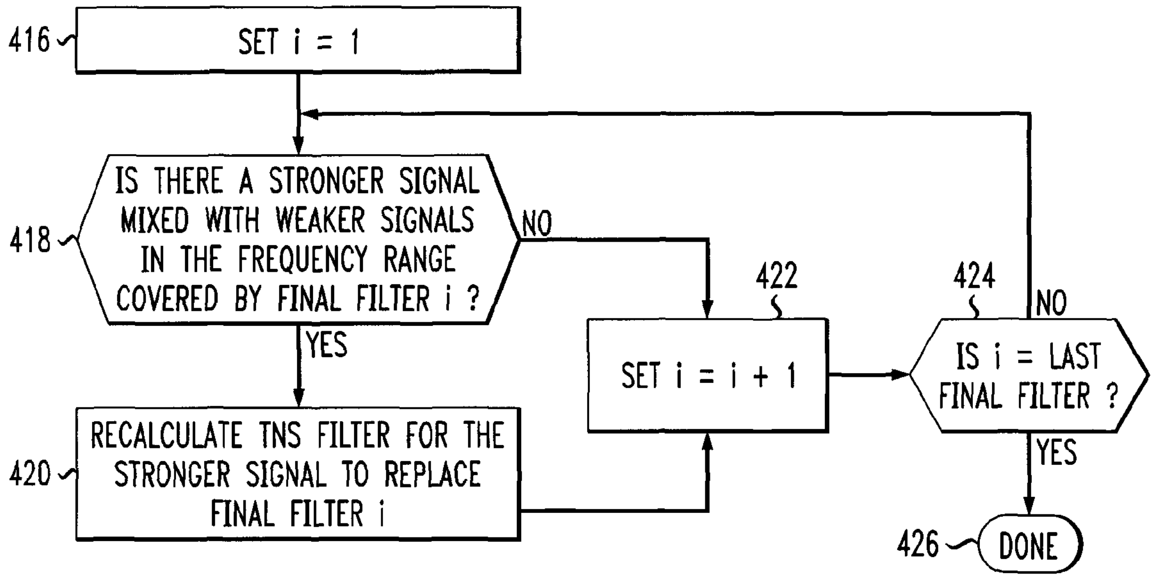
FIG. 4B is a flowchart illustrating an exemplary method of refining TNS filter bridging.

After the final filters have been identified, some refinement may be necessary. Refinement involves, for each final filter, recalculating the filter for only those frequencies corresponding to the strongest signal in the TNS band, and using the recalculated filter for the entire extent of the band (thus ignoring any weaker signals within the band). An exemplary procedure for accomplishing this is set forth in FIG. 4B. In step 416, counter i is set to 1. In step 418, a determination is made as to whether there is a stronger signal mixed with weaker signals in the frequency band covered by Final Filter i. This determination can be made by comparing the energy/bin in the original bands covered by the final TNS filter (e.g., in FIG. 2, the energy/bin in bands b1, b2 and b3 of the first final TNS filter). In an exemplary embodiment, if the energy/bin in one of the original bands is 2.5× greater than the energy/bin in each of the other original bands, then this constitutes a stronger signal mixed with weaker signals. If it is determined that a stronger signal is mixed with weaker signals, in step 420, the Final Filter i is recalculated for the stronger signal (i.e., using the band corresponding to the stronger signal, e.g., b2 in FIG. 2). In step 422, counter i is set to i+1, and in step 424, a determination is made as to whether i is the last final filter. If "i" is not the last final filter, steps 416 through 424 of FIG. 4B are repeated until the last final filter has been considered, in which case, the refining process is terminated in step 426.

One advantage of filter bridging is that it maintains compliance with the AAC standard while ensuring that the entire spectrum of the signal receives TNS. However, filter bridging still does not reach the full power of TNS. Thus, we have developed an alternate method of ensuring that the entire spectrum is covered by TNS, which, although not AAC compliant, is more efficient and more accurately captures the temporal structure of the time signal. The alternate method recognizes that very often, the underlying signal at different TNS frequency bands (and thus the initial TNS filters for these bands) will be strongly related. The signal at these frequency bands is referred to herein as the "foreground signal". In addition, the foreground signal often will be separated by frequency bands at which the underlying signal (and thus the initial filters for these bands) will also be related to one another. The signal at these bands is referred to herein as the "background signal". Thus, as illustrated in FIG. 6, the signal of FIG. 1F can be covered effectively by defining only two filters as a function of the initial filters—namely, Filter A for the foreground signal and Filter B for the background signal. Each is specified in frequency so that it can be switched as a function of frequency, which is necessary for complex real signals in an acoustic environment. An exemplary method for deploying TNS filters in accordance with the foregoing features of the present invention is described in detail in connection with FIG. 5. For purposes of illustration, we describe this aspect of our invention in connection with an underlying signal consisting of two audio sources. It will be understood, however, that the present invention may be readily extended to cases where the underlying signal comprises more than two audio sources (e.g., three or more) each having a different temporal structure that will be captured by a different TNS filter.

Figure 5:
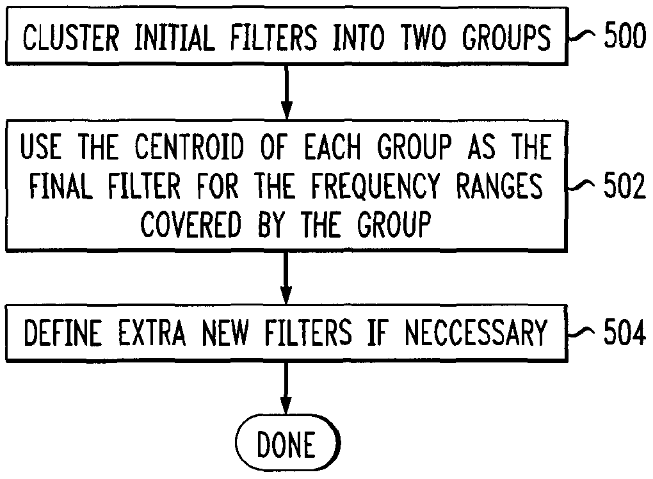
FIG. 5 is a flowchart illustrating an exemplary method of generating foreground and background TNS filters in accordance with yet another aspect of the present invention.
Figure 6:
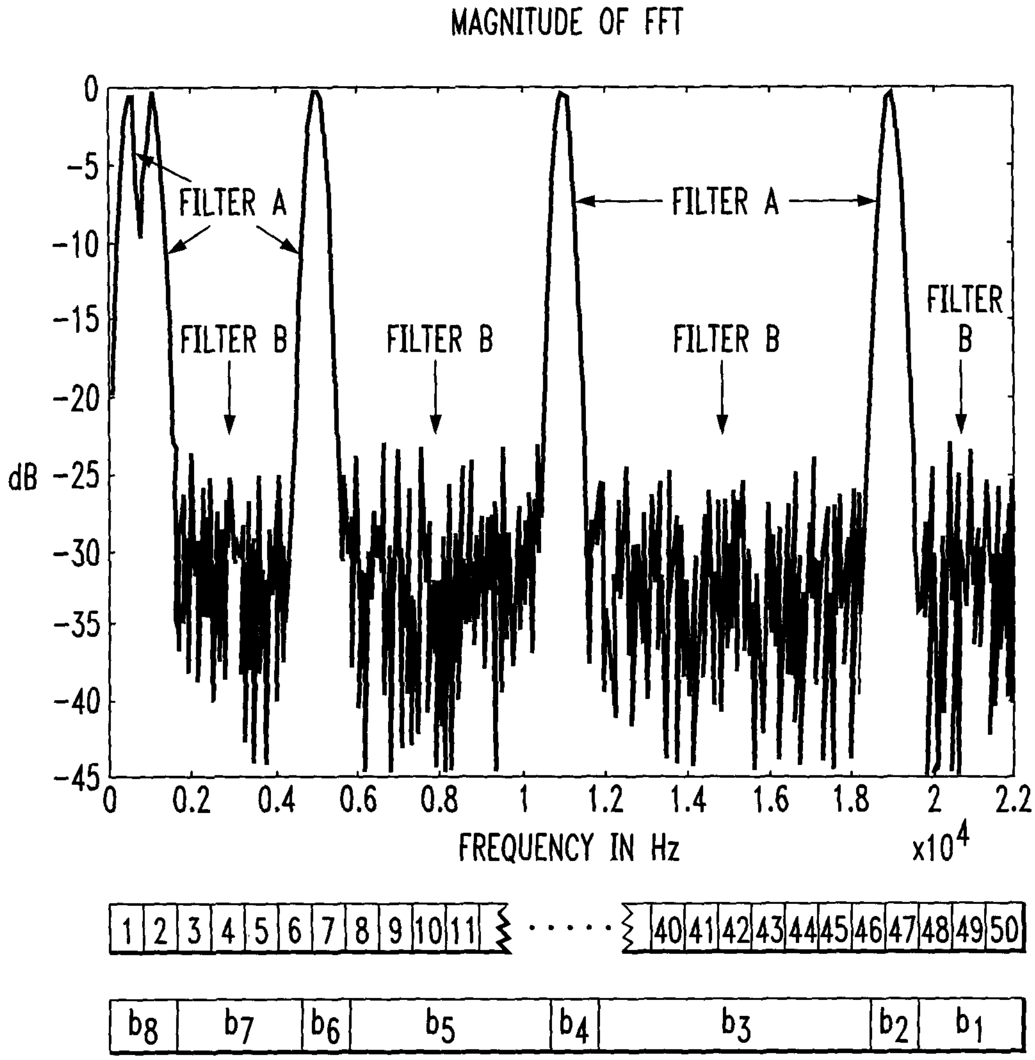
FIG. 6 is an enlargement of FIG. 1F illustrating the deployment of foreground and background TNS filters.

Referring to FIG. 5, after the initial filters have been determined (see, e.g., FIG. 3), in step 500, foreground filter signals are separated from background filter signals by clustering the initial filters into two groups based on the structure of their associated temporal envelopes. This can be performed using a well-known clustering algorithm such as the "Pairwise Nearest Neighbor" algorithm, which is described in A. Gersho and R. M. Gray, "Vector Quantization and Signal Compression", p. 360-61, Kluwer Academic Publishers, 1992, a copy of which is incorporated herein by reference. Clustering may be of the PARCOR coefficients of the initial filters or of the energies in each of the bands covered by the initial filters. Thus, for the signal of FIG. 2, eight TNS filters would be clustered into two groups, with each group comprising four TNS filters. From FIG. 2, it is clear that the filters for bands b1, b3, b5 and b7 will be in a first cluster and the filters for bands b2, b4, b6 and b8 will be in a second cluster. In step 502, the centroid of each cluster is used as the final TNS filter for the frequency bands in the cluster (i.e., the centroid of the first cluster is used as the final TNS filter for bands b1, b3, b5 and b7 and the centroid of the second cluster is used as the final TNS filter for bands b2, b4, b6 and b8). The deployment of two final filters, A and B, defined for the signal of FIG. 2, is illustrated in FIG. 6. In step 504, if necessary, each filter can be individually redefined at any point in frequency to ensure the proper handling of multiple auditory objects, constituting multiple temporal envelopes, that are interspersed in time and frequency. For example, returning to the signal of FIG. 2, if one of the impulses, such as the one in b4, was radically different from the other impulses in bands b2, b6 and b8, then another TNS filter could be calculated specifically for the radically different impulse of the foreground signal.

As mentioned above and for the reasons explained below, the method of filter deployment described in connection with FIG. 5 is not AAC compliant. Thus, we have developed two new syntax for coding the TNS filter information for transmission to the receiver. The conventional AAC syntax is shown in FIG. 7. It lists the TNS filters (from the highest SFB to the lowest SFB) of one coding block as a sequence comprising: the number of filters; the lowest SFB covered by the first filter; the order of the first filter (i.e., 0-12); the first filter's coefficients; and then the information relating to the second and third filters, if a second and third filter have been specified for the block. (As is evident from the foregoing, although the method of FIG. 5 employs only two filters, it is not AAC standard compliant because it would effectively require specifying eight filters as a result of the switching that occurs between the two filters across the spectrum.)

FIG. 8 illustrates an exemplary syntax for use with the method of filter deployment described in connection with FIG. 5. This syntax is a modification of the existing AAC syntax. It involves specifying that the <Order_Filter> field can contain a negative integer when the filter has previously been defined. For example, if the order field contains "−1", then the filter is the same as the first filter previously defined. If the order field contains "−2", then the filter is the same as the second filter previously defined, etc. FIG. 8 illustrates the above-described syntax for packing the eight TNS filters for the signal shown in FIG. 6. As shown in FIG. 8, the information regarding filters B and A in bands b1 and b2, respectively, is transmitted in the manner specified by the AAC standard. However, the use of Filter B, the first filter previously defined, in bands b3, b5 and b7 is specified simply by transmitting a "−1" in the filter order field. Similarly, the use of Filter A, the second filter previously defined, in bands b4, b6 and b8 is specified by transmitting a "−2" in the filter order field.

FIG. 9 provides an example of the syntax of FIG. 8 for a signal similar to the one shown in FIG. 6, except that we now assume that one of the impulses of the signal, such as the one in band b4, is radically different from the other impulses in bands b2, b6 and b8. As discussed above in connection with FIG. 5, a TNS filter can be calculated specifically for the radically different impulse. This is shown in FIG. 9 as "Filter C".

FIG. 10 illustrates another exemplary syntax for use with the method of filter deployment described in connection with FIG. 5. This syntax is basically a concatenation of the AAC syntax with the assistance of a mask of one bit per SFB (or some other pre-defined frequency division) transmitted to indicate the switching between the two filters (i.e., the background and foreground filters, A and B, respectively). The first bit, <is_TNS>, indicates whether or not TNS is active for this block. If TNS is not active, nothing follows. Otherwise, field <Filter A> will pack the number of filters, the low SFB number(s), the filter order(s) and the filter coefficients for Filter A. Likewise, field <Filter B> will pack the same information for Filter B. For each SFB number greater than, or equal to, the higher of the two lowest SFBs in fields <Filter A> and <Filter B>, respectively, the field <mask> will use a single bit, either 0 or 1, to indicate the use of either filter A or B.

FIG. 11 provides an example of the syntax of FIG. 10 for the signal shown in FIG. 6. As shown in FIG. 11, the field <is.TNS> would contain a "1", which, as discussed above, indicates that TNS is active for the frame. The field <Filter A> would contain the following information: a "1" to indicate the number of filters (for the signal of FIG. 6, only one filter is needed for the foreground signal); "$SFB_1$" to indicate that $SFB_1$ is the lowest SFB for Filter A; a "12" to indicate that the Order of Filter A is 12; and the coefficients for Filter A. The field <Filter B> would contain the following information: a "1" to indicate the number of filters (only one filter is needed for the background signal); "$SFB_4$" to indicate that $SFB_4$ is the lowest SFB for Filter B; a "10" to indicate that the Order of Filter B is 10; and the coefficients for Filter B. The field <Mask> will contain 47 bits (either a 0 or 1), one for each SFB in the range $SFB_{50}$ through $SFB_4$ to indicate the use of either Filter A or Filter B for each of those SFBs. From the information transmitted in fields <Filter A> and <Filter B>, it follows that Filter A is used for the range $SFB_3$ through $SFB_1$, and thus, it is unnecessary to transmit a bit for each of those SFBs.

FIG. 12 provides an example of the syntax of FIG. 10 for a signal similar to the one shown in FIG. 6, except that we now assume that one of the impulses of the signal, such as the one in band b4, is radically different from the other impulses in bands b2, b6 and b8. FIG. 12 illustrates, among other things, how the filter information for the foreground signal would be packed in field <Filter A> in the case where a separate TNS filter is calculated for the impulse of b4.

As shown in FIG. 12, the field <is.INS> would contain a "1" to indicate that INS is active for the frame. The field <Filter A> would contain the following information: a "3" to indicate that three filters are needed for the foreground signal; "$SFB_{44}$" to indicate that $SFB_{44}$ is the lowest SFB for the first filter of Filter A (for band b2); a "12" to indicate that the order of the first filter is 12; the coefficients of the first filter; "$SFB_{30}$" to indicate that $SFB_{30}$ is the lowest SFB for the second filter of Filter A (for band b4); a "12" to indicate that the order of the second filter is 12; the coefficients of the first filter; "$SFB_1$" to indicate that $SFB_1$ is the lowest SFB for the third filter of Filter A (for bands b6 & b8); and a "−1" to indicate that the third filter is identical to the first filter. The use of a −1 avoids having to transmit the filter order and the filter coefficients for the third filter and thus, conserves bandwidth. The field <Filter B>, as was the case for the example of FIG. 11, would contain the following information: a "1" to indicate the number of filters (unlike the foreground signal, only one filter is needed for the background signal); "$SFB_4$" to indicate that $SFB_4$ is the lowest SFB for Filter B; a "10" to indicate that the Order of Filter B is 10; and the coefficients for Filter B. As was also the case for the example of FIG. 10, the field <Mask> will contain 47 bits, one for each SFB in the range $SFB_4$ through $SFB_{50}$.

Given the present disclosure, it will be understood by those of ordinary skill in the art that the above-described TNS filter deployment techniques of the present invention may be readily implemented using one or more processors in communication with a memory device having embodied therein stored programs for performing these techniques.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

The invention claimed is:

1. A method comprising:

calculating a filter for each of a plurality of frequency bands;

determining a distance between coefficients in adjacent frequency bands;

clustering the filters into at least two groups based on energies in each of the frequency bands covered by the filters;

merging the clustered filters with a shortest distance between coefficients; and processing audio signals using the merged filters.

2. The method of claim 1, wherein the filters are temporal noise shaping filters.

3. The method of claim 1, wherein the coefficients are partial autocorrelation coefficients.

4. The method of claim 2, wherein clustering the filters in at least two groups further comprises:

clustering the temporal noise shaping filters based on respective partial autocorrelation coefficients of the temporal noise shaping filters.

5. The method of claim 1, wherein merging clustered filters comprises calculating a new filter for a frequency range comprising the adjacent frequency bands of the filters with the shortest distance.

6. The method of claim 1, wherein merging the clustered filters further comprises:

calculating a new temporal noise filter for a frequency range comprising adjacent frequency bands of the temporal noise shaping filters with the shortest distance.

7. A system comprising:

a processor; and a computer-readable storage medium having instructions stored which, when executed by the processor, cause the processor to perform a method comprising:

calculating a filter for each of a plurality of frequency bands;

determining a distance between coefficients in adjacent frequency bands;

clustering the filters into at least two groups based on energies in each of the frequency bands covered by the filters;

merging the clustered filters with a shortest distance between coefficients; and processing audio signals using the merged filters.

8. The system of claim 7, wherein the filters are temporal noise shaping filters.

9. The system of claim 7, wherein the coefficients are partial autocorrelation coefficients.

10. The system of claim 8, wherein clustering of the filters in at least two groups further causes the processor to cluster the temporal noise shaping filters based on respective partial autocorrelation coefficients of the temporal noise shaping filters.

11. The system of claim 7, wherein merging of the clustered filters further causes the processor to calculate a new filter for a frequency range comprising the adjacent frequency bands of the filters with the shortest distance.

12. The system of claim 7, wherein merging of the clustered filters further causes the processor to calculate a new temporal noise filter for a frequency range comprising adjacent frequency bands of the temporal noise shaping filters with the shortest distance.

13. A non-transitory computer-readable storage medium having instructions stored which, when executed by a computing device, cause the computing device to perform a method comprising:

calculating a filter for each of a plurality of frequency bands;

determining a distance between coefficients in adjacent frequency bands;

clustering the filters into at least two groups based on energies in each of the frequency bands covered by the filters;

merging the clustered filters with a shortest distance between coefficients; and processing audio signals using the merged filters.

14. The non-transitory computer-readable storage medium of claim 13, wherein the filters are temporal noise shaping filters.

15. The non-transitory computer-readable storage medium of claim 13, wherein the coefficients are partial autocorrelation coefficients.

16. The non-transitory computer-readable storage medium of claim 14, wherein clustering the filters in at least two groups further comprises clustering the temporal noise shaping filters based on respective partial autocorrelation coefficients of the temporal noise shaping filters.

17. The non-transitory computer-readable storage medium of claim 13, wherein merging clustered filters comprises calculating a new filter for a frequency range comprising the adjacent frequency bands of the filters with the shortest distance.

18. The non-transitory computer-readable storage medium of claim 13, wherein merging the clustered filters further comprises calculating a new temporal noise filter for a frequency range comprising adjacent frequency bands of the temporal noise shaping filters with the shortest distance.

* * * * *